United States Patent [19]

Skarvan et al.

[11] Patent Number: 4,693,077
[45] Date of Patent: Sep. 15, 1987

[54] CLOSED-LOOP ENGINE CONTROL WITH FEEDBACK TORQUE ERROR COMPENSATION

[75] Inventors: Charles A. Skarvan, Indianapolis; Stephen A. fisher, Whitestown, both of Ind.

[73] Assignee: General Motors Corporation, Detroit, Mich.

[21] Appl. No.: 886,624

[22] Filed: Jul. 18, 1986

[51] Int. Cl.⁴ .............................................. F02C 9/28
[52] U.S. Cl. .............................. 60/39.282; 73/862.19; 123/436
[58] Field of Search .................. 60/39.282; 73/862.17, 73/862.18, 862.19, 862.33, 862.34; 123/436, 492, 493, 494; 416/43

[56] References Cited

U.S. PATENT DOCUMENTS

| | | | |
|---|---|---|---|
| 2,985,243 | 5/1961 | Tyler et al. | 60/39.282 |
| 4,008,567 | 2/1977 | Hirsch | 60/39.282 |
| 4,286,324 | 8/1981 | Ingram | 60/39.282 |
| 4,435,987 | 3/1984 | Sugimoto | 73/862.17 |
| 4,550,595 | 11/1985 | Venema | 73/862.19 |
| 4,638,673 | 1/1987 | Blaschke | 73/862.17 |

*Primary Examiner*—Louis J. Casaregola
*Attorney, Agent, or Firm*—David L. Ahlersmeyer

[57] ABSTRACT

A closed-loop engine control system is disclosed in which an engine is controlled to provide power to a load as a function of measured feedback torque. A programmable digital controller modifies the feedback torque by adding to it a synthesized correction torque provided by the product of the engine polar moment of inertia and the engine acceleration. The modified feedback torque is used for either closed-loop torque or horsepower engine control.

3 Claims, 3 Drawing Figures

> 4,693,077

CLOSED-LOOP ENGINE CONTROL WITH FEEDBACK TORQUE ERROR COMPENSATION

The Government has rights in this invention pursuant to Contract Number N00019-83-C-0419 awarded by the Department of the Navy.

This invention relates to closed-loop torque and horsepower engine control based upon feedback torque wherein compensation is provided for the dynamic difference between the measured feedback torque and actual gross engine torque.

More particularly, the present invention is applicable to a closed-loop system in which an engine is controlled to provide power to a load as a function of the feedback torque measured by a transducer operating along the driveline between the engine and the load. A problem arises in such a system because the feedback torque is dynamically different than the actual engine torque, i.e., the feedback torque signal can lag or lead in phase and can be amplified or attenuated in amplitude relative to the engine torque.

This problem degrades both system stability and transient response characteristics. The greater the engine polar moment of inertia is in relation to the total polar moment of inertia of the system (engine and load), the greater the torque difference problem. The present invention alleviates the above problem by modifying the feedback torque so as to compensate for the dynamic torque difference. Specifically, the invention recognizes that the feedback torque measured by the transducer represents the gross engine torque less the torque required to accelerate (positively or negatively) the polar moment of inertia of the engine. Accordingly, pursuant to the invention, the measured feedback torque is modified by adding to it a synthesized correction torque provided by the product of the polar moment of inertia of the engine and the engine acceleration. As so modified, the feedback torque and overall system response and stability are materially improved.

The invention is further described below, as to a specific embodiment, in conjunction with the following drawings.

Figure 1:
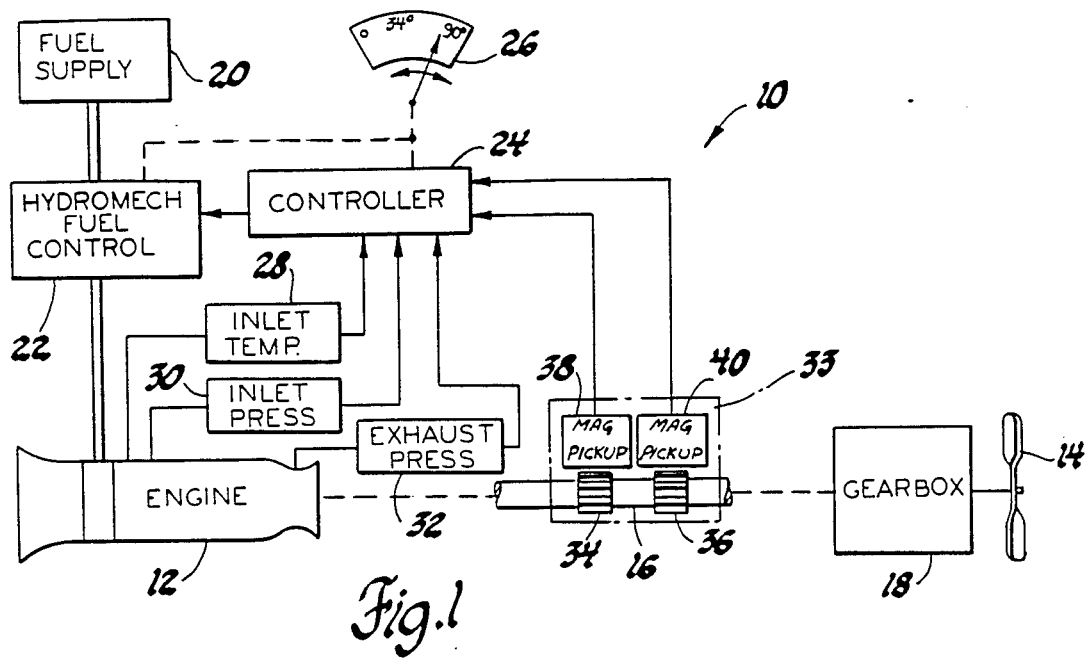
FIG. 1 is a diagrammatic representation of an exemplary closed-loop engine control system to which the invention is applicable.

Referring now to FIG. 1, there is depicted a closed-loop system 10 of the type to which the present invention is applicable. The system 10 includes an engine 12 for providing rotary motive power to a propeller 14 through a powertrain which includes a driveshaft 16 and a gearbox 18. For purposes of illustration, but without any limitation of the invention, the engine 12 may be a T56-A-427 gas turbine engine as manufactured by the Allison Gas Turbine Division of General Motors Corporation, wherein the driveshaft 16 and the gearbox 18 are integral therewith. Likewise, the propeller 14 may be a HSD 54460-1 propeller/control system as manufactured by Hamilton Standard Corporation.

In the usual manner, the power output of the engine 12 is determined by the amount of fuel applied from a fuel supply 20 through an appropriate fuel scheduling apparatus 22. In at least one functional mode of the system 10, a controller 24 operates the apparatus 22 to control the amount of fuel supplied to the engine 12 as a function of the difference between a desired engine power output $P_d$ and a measured feedback power $P_f$. The controller 24 may either have full authority over fuel scheduling or trim the fuel delivered by a mechanical fuel scheduling means to achieve desired fuel flow. In the embodiment shown in FIG. 1, an operator adjustable power lever 26 is mechanically linked to apparatus 22 for fuel scheduling during open-loop operation. During closed-loop operation, controller 24 will trim the mechanically scheduled fuel flow to achieve the required value. For purposes of illustration, but without any limitation of the invention, the controller 24 may be a EH-R2 programmable digital engine control and the fuel scheduling apparatus 22 may be a AP-B6 hydromechanical control, each as manufactured by Bendix Division of Allied Corporation.

The controller 24 determines the desired engine power output $P_d$ as a function of the setting of the power lever 26, the compressor inlet temperature and pressure, and the exhaust pressure of the gas turbine engine 12. The compressor inlet temperature is measured by an appropriate temperature transducer 28, and the compressor inlet pressure and the exhaust pressure are measured by appropriate pressure transducers 30 and 32, respectively. Similarly, the controller 24 determines the measured feedback power $P_f$ as a function of the feedback torque $T_f$ and the feedback speed $N_f$ of the driveshaft 16 which are calculated by the controller 24 in response to appropriate input signals received from a transducer 33.

As an example, and without any limitation upon the invention, the transducer 33 includes driveshaft 16, gear teeth assemblies 34 and 36, and magnetic pickups 38 and 40. In operation, the magnetic pickups 38 and 40 sense the motion of the gear teeth of assemblies 34 and 36, respectively, as the driveshaft 16 rotates, and provide electrical pulses to controller 24. In turn, the controller 24 computes feedback torque $T_f$ by calculating the phase shift difference between the pulse signals received from magnetic pickups 38 and 40. In like manner, feedback speed $N_f$ is calculated based upon the pulse signal received from either magnetic pickup 38 or 40.

Figure 2:
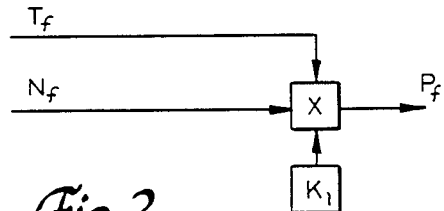
FIG. 2 is a diagram illustrative of the operation of the digital controller of FIG. 1 in the absence of the present invention.

It will be appreciated that the system 10 is a closed-loop horsepower engine control based upon feedback torque $T_f$, i.e., the principal feedback quantity is the torque $T_f$ of the driveshaft 16 as measured by the transducer 33. The speed $N_f$ of the driveshaft 16 is a secondary feedback quantity by which the feedback torque $T_f$ is multiplied in the controller 24 to derive a feedback power $P_f = K_1 (T_f * N_f)$. The performance of this product function within the controller 24 may be diagramatically depicted, as shown in FIG. 2, by a simple multiplication operation. The constant $K_1$ represents any conversion factor which may be necessary to scale the feedback power $P_f$ for direct comparison with the desired engine output power $P_d$. For example, where it is desired to represent feedback power $P_f$ in units of horsepower, and feedback torque $T_f$ is represented in units of foot-pounds and feedback speed $N_f$ is represented in units of revolutions per minute, the appropriate value for $K_1$ is 1/5252.

A problem arises in a closed-loop feedback torque system of the type shown in FIG. 1 in that there is an inherent difference between the engine parameter being controlled and the feedback variable being measured.

Specifically, fuel flow produces engine thermodynamic power or, alternatively, actual engine output power $P_a$. The actual engine output power $P_a$ in turn produces gross engine torque comprised of a first torque component required to accelerate the moment of inertia of the engine itself and a second torque component available to the mechanical load. The transducer providing the feedback variable measures only the torque transmitted through the shaft to the load, namely, the gross engine torque less the torque required to accelerate the moment of inertia of the engine Therefore during dynamic operation ($dN_f/dt \neq 0$), the feedback variable being measured by the transducer does not include the amount of torque required to accelerate (positively or negatively) the engine polar moment of inertia. Consequently, in at least the above-described functional mode of the system 10, feedback power $P_f$ does not accurately represent the actual engine output power $P_a$.

The present invention alleviates the above problem by adding to the feedback torque $T_f$ a compensating synthesized correction torque $T_c$ equal to the product of the moment of inertia of the engine and the engine acceleration. As a result, a feedback variable essentially equal to the actual engine output power $P_a$ is provided for closed-loop engine control. Furthermore, use of the digital controller 24 of the preferred embodiment provides continuous correction of the transducer feedback variable under dynamic operating conditions. The moment of inertia of the engine $I_e$ is a constant that may be experimentally or mathematically determined and supplied to the controller 24. The acceleration of the engine $dN_f/dt$ can be calculated within the controller 24 by differentiating the feedback engine speed $N_f$.

Figure 3:
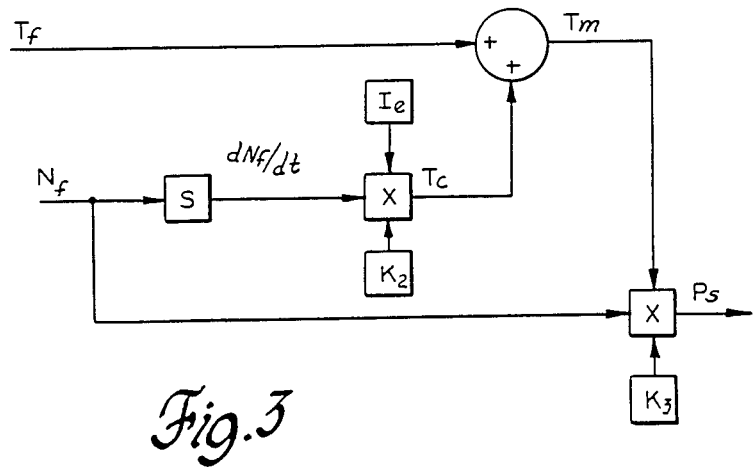
FIG. 3 is a diagram illustrative of the operation of the digital controller of FIG. 1 in accord with the principles of this invention.

FIG. 3 diagramatically shows the necessary modification of feedback torque $T_f$ by the controller 24 in conformance with the principles of the invention. Specifically, the feedback speed $N_f$ is differentiated to provide a quantity $dN_f/dt$ representing the acceleration of the engine 12. The acceleration $dN_f/dt$ is then multiplied by the polar moment of inertia $I_e$ of the engine 12 to obtain a synthesized correction torque $T_c = K_2 (I_e * dN_f/dt)$. The constant $K_2$ represents any conversion factor which may be necessary to scale correction torque $T_c$ to the same dimensional units as feedback torque $T_4$. The correction torque $T_c$ is then summed with the feedback torque $T_f$ to provide a modified torque $T_m = T_f + T_c$. The modified torque $T_m$ is then multiplied by the feedback speed $N_f$ to provide a synthesized engine power output $P_s = K_3 (T_m * N_f)$, representing actual engine output power $P_a$, for use as the feedback quantity in the closed-loop engine control system 10 of FIG. 1. The constant $K_3$ represents any conversion factor which may be necessary to scale the synthesized engine output power $P_s$ for direct comparison with the desired engine output power $P_d$. In the illustrated embodiment of the invention, the controller 24 operates the fuel scheduling apparatus 22 to control the amount of fuel applied to the engine 12 in response to the difference between the desired engine power output $P_d$ and the synthesized engine power output $P_s$.

The improved system stability and transient response characteristics attributable to the present invention depend upon the relation of the moment of inertia of the engine to the total moment of inertia of the system (engine and load). The greater the engine inertia in comparison to the total inertia of the system, the greater the potential improvement. For example, in the system of the preferred embodiment, the engine moment of inertia of an Allison T56-A-427 turboshaft engine is approximately 74% of the total system inertia, thereby resulting in significant control improvement.

It will be appreciated that the foregoing description of a preferred embodiment of the invention is presented by way of illustration only (and not by way of any limitation) and that various alternatives and modifications may be made to the illustrated embodiment without departing from the spirit and scope of the invention.

The embodiments of the invention in which an exclusive property or privilege is claimed are defined as follows:

1. In a closed-loop system in which an engine is controlled to provide power to a load as a function of measured feedback torque, the improvement comprising:
    means for modifying the feedback torque by adding to it a synthesized correction torque provided by the product of the engine polar moment of inertia and the engine acceleration thereby to compensate the system for the phase and amplitude error between the measured feedback torque and the actual gross engine torque caused by the circumstance that the measured feedback torque represents the actual gross engine torque less the torque required to accelerate the engine moment of inertia, whereby the modified feedback torque more nearly represents the actual gross engine torque thereby improving the response and stability of the system.

2. A closed-loop engine control system, comprising:
    an engine including a rotary output;
    a load;
    torque transmitting means for connecting the rotary output of the engine to the load;
    means for measuring the torque transmitted by the torque transmitting means;
    means for adding to the measured torque a correction torque equal to the moment of inertia of the engine multiplied by the acceleration of the engine; and
    means for operating the engine in response to the sum of the measured torque and the correction torque.

3. A closed-loop horsepower engine control system including: an engine including a rotary output; a rotary mechanical load; a shaft connected between the engine output and the load; means for measuring the torque transmitted by the shaft; means responsive to the measured torque and the speed of the engine for providing an indication of the horsepower transmitted by the shaft; and means for operating the engine in response to the horsepower indication, the improvement comprising:
    means for adding to the measured torque a compensating torque equal to the moment of inertia of the engine multiplied by the acceleration of the engine, whereby the system is compensated for the difference between the actual gross engine torque and the torque transmitted by the shaft, the difference representing the torque required to accelerate the rotary moment of inertia of the engine.

* * * * *